United States Patent [19]
Cleveland

[11] Patent Number: 5,815,931
[45] Date of Patent: Oct. 6, 1998

[54] CUTTING GUIDE FOR CONTROLLING THE DIRECTION AND CUT OF A HAND HELD POWER CUTTING TOOL

[75] Inventor: Todd Cleveland, Marshfield, Mass.

[73] Assignee: Robert E. Cummings, Plymouth, Mass.; a part interest

[21] Appl. No.: 739,271

[22] Filed: Oct. 29, 1996

[51] Int. Cl.[6] .................................................. B27B 9/04
[52] U.S. Cl. .............................. 30/373; 30/293; 30/374
[58] Field of Search .......................... 30/371, 373, 374, 30/375, 388, 390, 293, 294; 83/745, 574

[56] References Cited

U.S. PATENT DOCUMENTS

| | | | |
|---|---|---|---|
| 2,676,624 | 4/1954 | Gecmen | 30/373 |
| 2,800,933 | 7/1957 | Michael | 30/373 |
| 4,016,649 | 4/1977 | Kloster | 30/373 |
| 4,128,940 | 12/1978 | Ong | 30/373 |
| 4,628,608 | 12/1986 | Kuhlmann et al. | 30/373 |
| 4,777,726 | 10/1988 | Flowers | 30/374 |
| 4,945,799 | 8/1990 | Knetzer | 83/745 |
| 5,084,977 | 2/1992 | Perkins | 30/374 |

*Primary Examiner*—Eugenia Jones
*Attorney, Agent, or Firm*—Morland C. Fischer

[57] ABSTRACT

A cutting guide to be removably attached to any one of a number of hand operated power cutting tools such as, for example, a circular saw for cutting a substantially planar workpiece. The cutting guide includes an L-shaped guide plate having first and second sets of channel ears affixed thereto. First and second position adjustable guide arms are slidable received through respective ones of the first and second sets of channel ears such that the guide arms are arranged in perpendicular alignment relative to one another. The first guide arm is selectively positioned to engage and travel along a side of the workpiece so that the cutting tool moves in a cutting path that is parallel to the side of the workpiece. The second guide arm extends to a point that is spaced from an end of the workpiece so as to move with the cutting tool towards and into engagement with the end of the workpiece to thereby limit the length of the cutting path to the distance from which the second guide arm is spaced from the workpiece. In the alternative, the second guide arm engages and runs along the end of the workpiece so that the cutting path will be held perpendicular to such end.

12 Claims, 4 Drawing Sheets

CUTTING GUIDE FOR CONTROLLING THE DIRECTION AND CUT OF A HAND HELD POWER CUTTING TOOL

BACKGROUND OF THE INVENTION

1. Field of the Invention

This invention relates to a universal adapter for a hand held power cutting tool that functions as a cutting guide for accurately controlling the direction of the tool and the length of the cut relative to a substantially planar workpiece.

2. Background Art

Tool guides are know which, when attached to the tool, enable the tool to be moved along a cutting path so as to follow a peripheral edge of the workpiece to be cut. Such guides, which typically are in the shape of a T-square, are fixedly attached to the tool and enable the tool to move in a line parallel to the peripheral edge of the workpiece. Reference may be made to one or more of the following patents for example of conventional tool guides.

U.S. Pat. No. 4,050,340, issued to Flanders, discloses a power tool track that can be coupled to an existing tool, such as an electric circular saw to enable either straight or angular cuts.

U.S. Pat. No. 4,306,479, issued to Eberhardt, discloses a portable guide for a power cutting tool consisting of a guide member to be placed on a workpiece and a tool guiding edge.

U.S. Pat. No. 4,852,257, issued to Moore, discloses an attachment to a circular saw, the attachment being of rectangular shape and including a moveable guide, the guide being solely adjustable along, and restricted to, one axis of the attachment.

However, one significant disadvantage that is common to such conventional tool guides is that such guides are only compatible with a single tool and are incapable of controlling both the direction in which the tool is moved and the length of the cut relative to a planar workpiece. Moreover, none of the aforementioned patents shows or discloses a universal adapter that may be detachably connected to the shoe plate of an existing hand held power cutting tool and which can accurately control the length of the cut in a longitudinal direction parallel to an edge of the workpiece.

SUMMARY OF THE INVENTION

In general terms, a simple, easy to install cutting guide is disclosed for controlling the direction of movement of a power cutting tool and the length of the cut made by the tool. The cutting guide includes a guide plate, locking means for removably attaching the cutting guide to the support shoe of the tool, and means to control the position of the tool relative to a planar workpiece. The control means has a guide frame and a pair of elongated guide arms that are removably connected to the guide frame for controlling the direction of the tool relative to a side edge of the workpiece and the length of the cut relative to the rear edge of the workpiece. The positions of the guide arms are adjustable to account for workpieces of different size.

By virtue of the present invention, a cutting guide is available to be removably attached to a conventional power tool as a single, preassembled unit, such that no further assembly is required on the part of the user. Thus, no safety features (e.g. a safety guard) must first be removed from the tool before the guide can be attached. Accordingly, the cutting guide of the present invention may be installed in a few minutes. Likewise, the cutting guide may be quickly and easily removed from the tool so as not to be regarded as a fixture, where one would be otherwise discouraged from removing the cutting guide once it was attached. What is still more, by virtue of the ability to vary the locking pressure applied by the locking means, the cutting guide is advantageously adapted to fit virtually any commercially available power cutting tool.

DETAILED DESCRIPTION OF THE INVENTION

Figure 1:
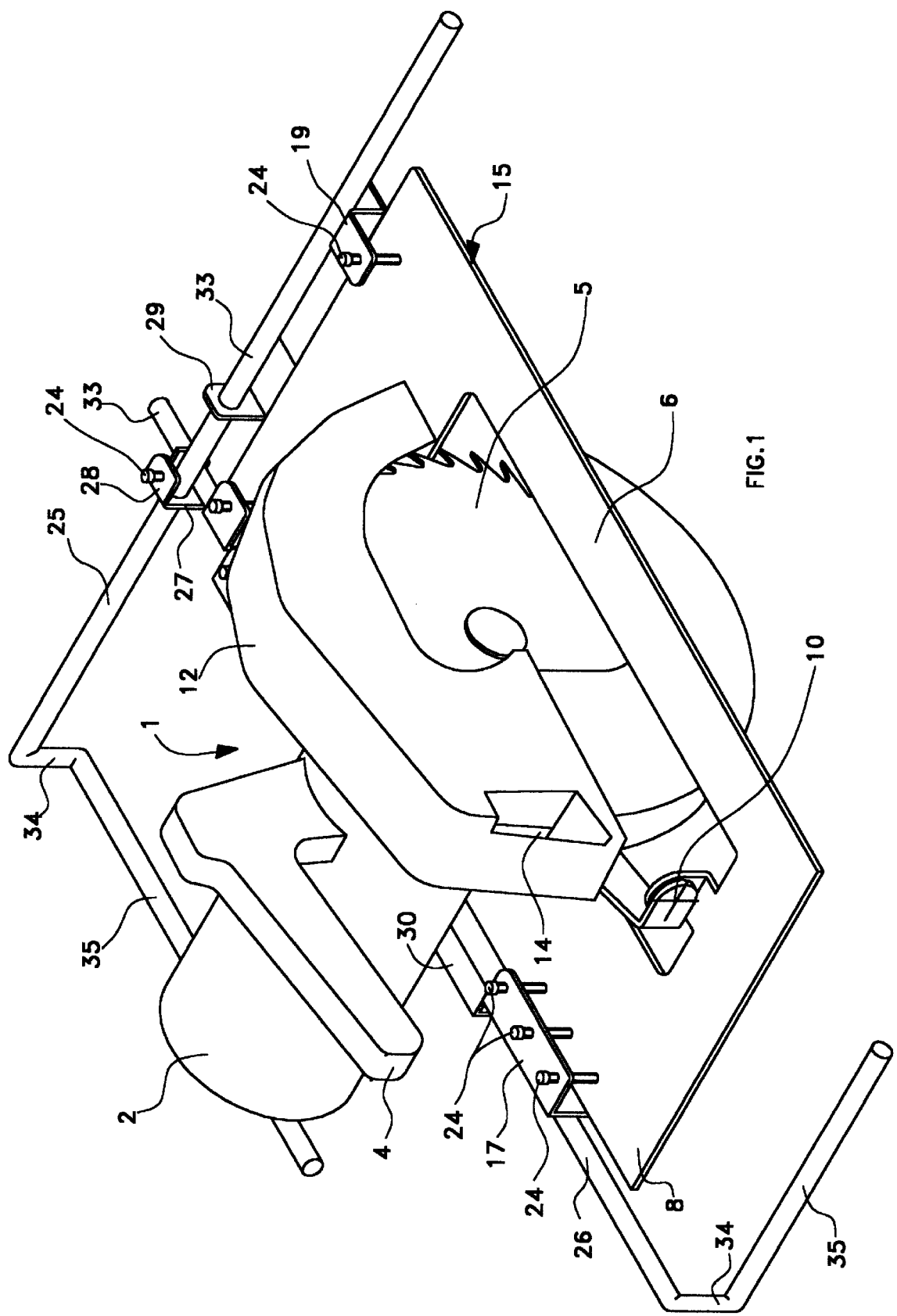
FIG. 1 is a perspective view of a conventional circular tool to which the cutting guide which forms the present invention is attached.

The cutting guide 15 for controlling both the direction in which a hand-held power tool is moved to cut a planar workpiece and the length of the cut is initially described while referring to FIG. 1 of the drawings, wherein there is shown a conventional circular saw 1 having the cutting guide 15 attached thereto. Being that the circular saw 1 is of conventional design, it will not be described in detail. Briefly, however, the saw 1 includes the usual motor housing 2, carrying handle 4, circular cutting blade 5, horizontally extending support shoe 6, slide bars 8, cutting angle adjustment lever 10, rotatable safety guard 12 and associated safety guard lever 14. In the illustrated embodiment of the invention, the cutting instrument of the hand held power tool is the circular saw blade 5. However, it is to be understood that correspondingly sized cutting guides for other types of hand held power tools, including, but not limited to, jigsaws, routers, etc., having different cutting instruments, can be similarly constructed, so that the scope of the invention is not limited solely to circular saws.

Figure 2:
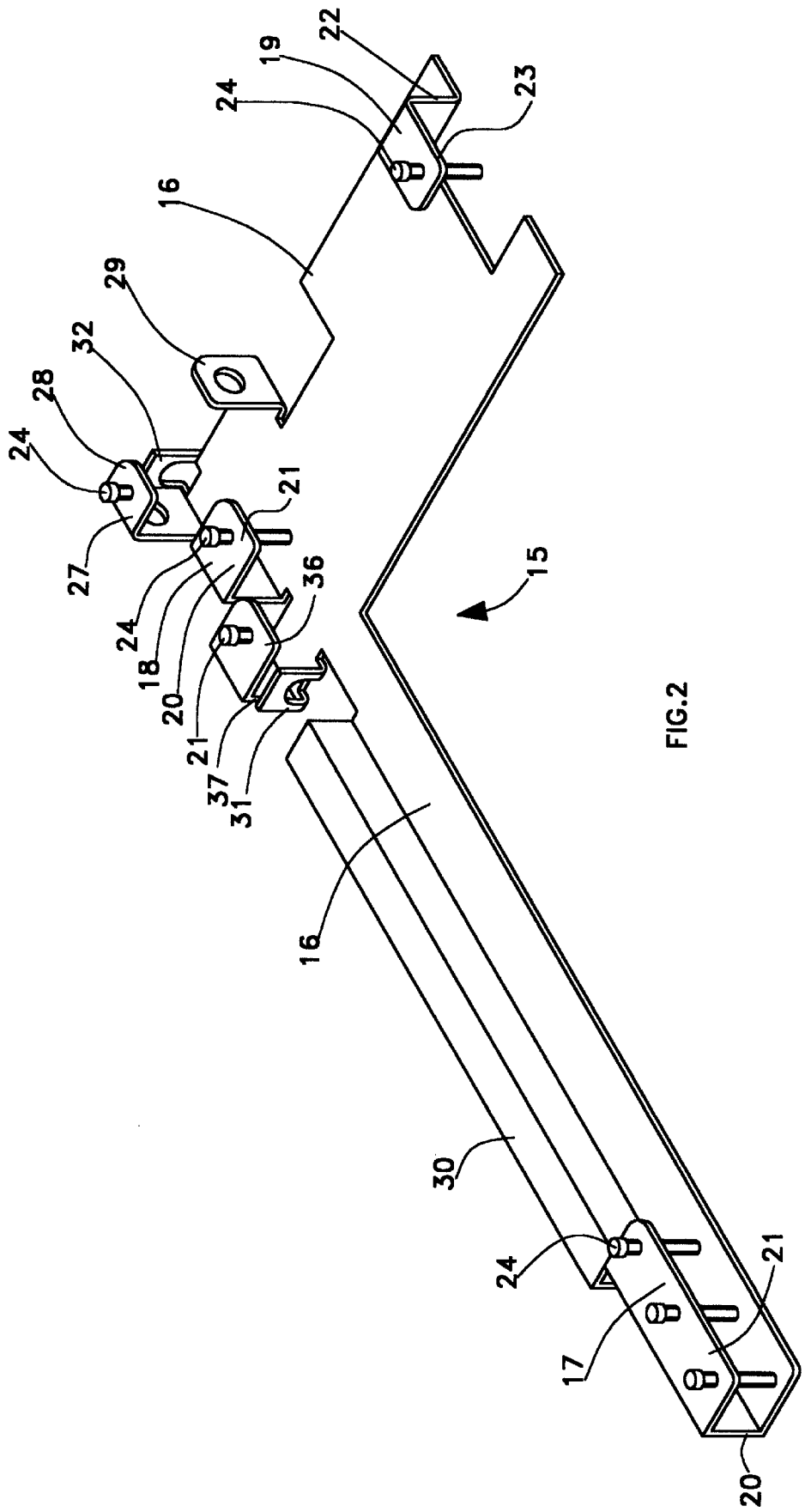
FIG. 2 is a perspective view of the cutting guide of the present invention.
Figure 3:
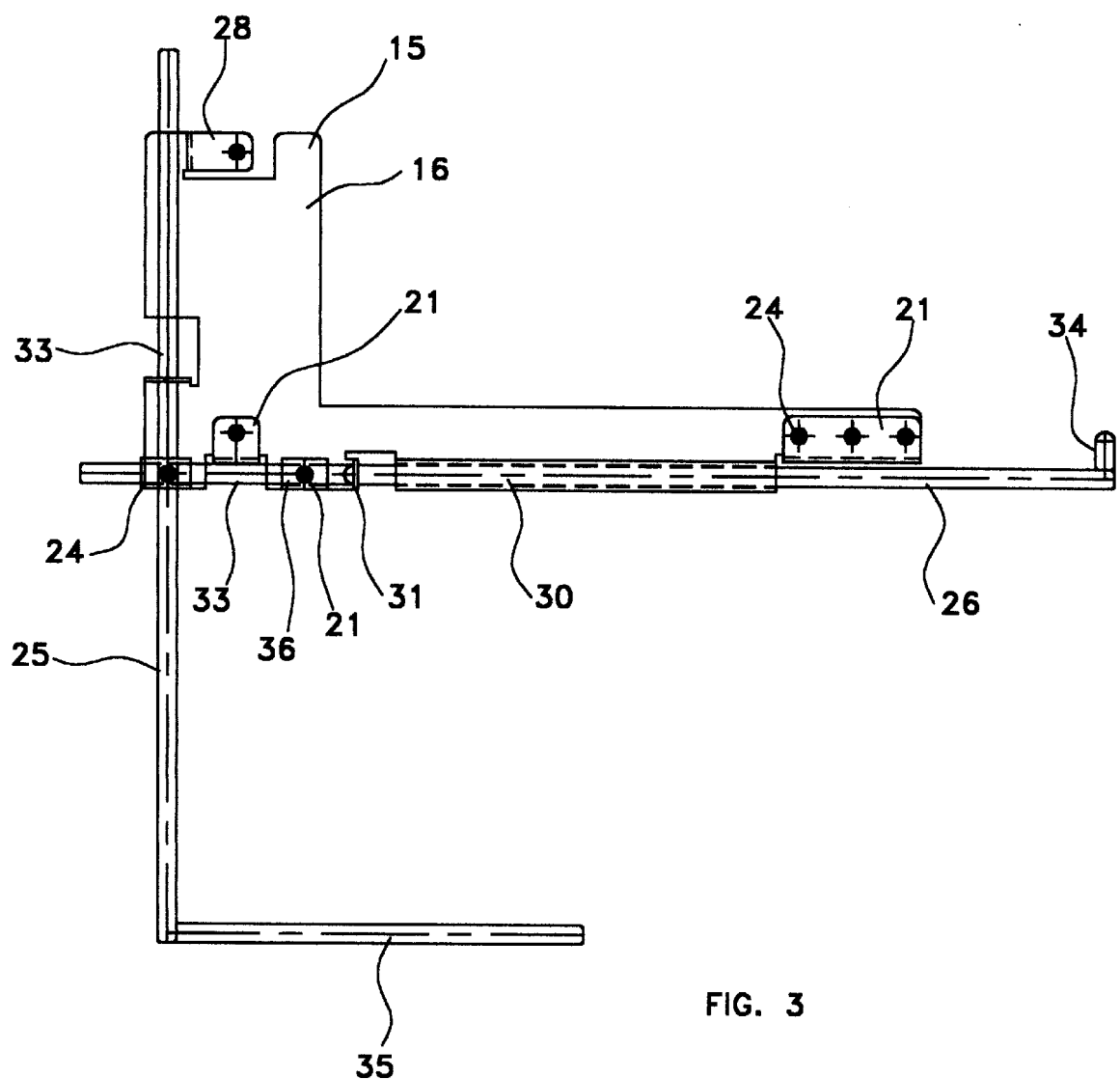
FIG. 3 is top view of the cutting guide of FIG. 2.
Figure 4:
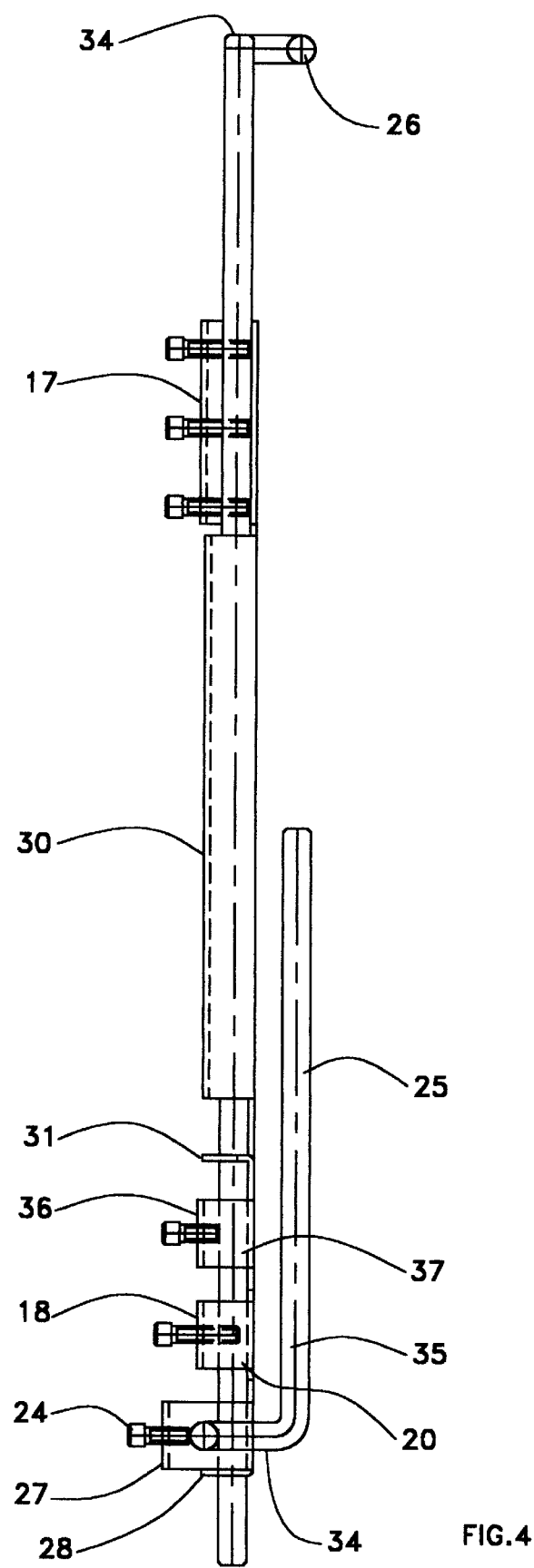
FIG. 4 is a side view of the cutting guide of FIG. 2.

The details of the cutting guide 15 which forms the present invention are now described while also referring to FIGS. 2, 3 and 4 wherein like numbers designate equivalent parts. The cutting guide 15 is manufactured from a single piece of a malleable metal of the kind which can be shaped by means of a metal press. Cutting guide 15 includes a guide plate 16 substantially in the shape of an inverted L. In the assembled relationship with the saw 1, the guide plate 16 is positioned such that the guide 15 will not interfere with saw blade 5. The cutting guide 15 is attached to the support shoe 6 (of FIG. 1) by means of a pair of U-shaped locking channels 17 and 18 and an L-shaped locking ear 19. Locking channels 17 and 18, which receive therewithin one side of the support shoe 6 that lies opposite blade 5, are formed by the guide plate 16, an upturned first member 20 of approximately ½" height that is integrally formed with and extends perpendicularly from guide plate 16, and a lug 21 that is coextensively connected to and extends outwardly from perpendicular member 20. The lugs 21 of channels 17 and 18 are arranged in spaced parallel alignment above guide plate 16.

Locking ear 19, which receives the leading edge of support shoe 6, is positioned at the front of guide plate 16. Locking ear 19 is formed from a perpendicular member 22 of approximately ½" height that is integrally formed with and turns upwardly from the guide plate 16. Locking ear 19 terminates at a lug 23 that projects outwardly from member 22 so as to lie in spaced parallel alignment above guide plate 16. Holes are drilled and tapped through the lugs 21 of the locking channels 17 and 18 and the lug 23 of locking ear 19. Locking screws 24 are threadedly inserted in each of the drilled and tapped holes, so that when the support shoe 6 of the saw 1 is located within each of the locking channels 17 and 18 (between the guide plate 16 and the respective lugs 21) and the locking ear 19 (between the guide plate 16 and the lug 23), the locking screws 24 can be tightened, whereby the support shoe 6 is clamped between guide plate 16 and the locking screws 24. The locking screw 24 that is threaded through lug 23 of the locking ear 19 advantageously biases the cutting guide 15 against the support shoe 6 regardless of the width thereof.

Cutting guide 15 also includes a pair of adjustable guide arms 25 and 26 (best shown in FIG. 1) that are perpendicularly disposed and slidable relative to each other. The guide arms 25 and 26 are lockably inserted into a pair of guide ears 27 and 29 at the front of guide plate 16 for controlling the position of the cutting blade 5 of saw 1 relative to the workpiece to be cut. Guide ears 27 and 29 are integrally affixed to and turn upwardly and perpendicularly from guide plate 16 so as to lie in spaced parallel alignment with one another. Guide ear 27 has a circular hole formed therethrough for receiving guide arm 25. A lug 28 is coextensively formed with and extends outwardly from the guide ear 27 so as to lie in spaced parallel alignment above the guide plate 16 by a distance that is equal to the combined thickness of the guide arms 25 and 26. A hole is formed through lug 28 to receive another locking screw 24, which is biased against guide arm 25 to thereby lock the position of guide arm 25 relative to cutting guide 15. Guide ear 29 also has a circular hole formed therethrough for receiving the guide arm 25. As is best shown in FIG. 1, the holes formed through guide ears 27 and 29 are axially aligned to facilitate the sliding adjustment of the guide arm 25 along the front of the cutting guide 15.

Running longitudinally along the side of the L-shaped guide plate 16, and located between but offset from locking channels 17 and 18, a guide channel 30 is formed through which the guide arm 26 is received to thereby control the displacement of guide arm 26 relative to guide plate 16. Guide channel 30 has the shape of an inverted U. A first channel ear 31 is axially aligned with and spaced from guide channel 30 at the side of guide plate 16. Channel ear 31 turns upwardly and perpendicularly from the guide plate 16. An aperture is formed in the channel ear 31 for receiving guide arm 26. The aperture is substantially semicircular in shape and elongated on its lower side to enable the receipt therethrough of guide arm 26. A second channel ear 32 turns upwardly and perpendicularly from the front corner of guide plate 16. Channel ear 32 is arranged in spaced axial alignment with guide channel 30 and the first channel ear 31. Channel ear 32 has a semicircular aperture which is substantially the shape of the aperture of channel ear 31. Guide arm 26 is inserted through each of the axially aligned guide channel 30 and the channel ears 31 and 32 along the side of the guide plate 16 to control the movement of circular saw 1 relative to the workpiece in a manner that will soon be described.

Referring briefly now to FIGS. 3 and 4 of the drawings, an additional means for securing the position of guide arm 26 is shown. A locking ear 36 has a member 37 of approximately ½" height turning upwardly and perpendicularly from guide plate 16. A lug 21 extends outwardly from member 37 so as to lie in spaced parallel alignment above the guide plate 16. A hole is drilled and tapped in lug 21 to receive a locking screw 24 which is biased against guide arm 26 to thereby lock guide arm 26 in position relative to cutting guide 15.

Guide arms 25 and 26 (of FIG. 1) are each formed from an elongated metal rod. Each arm 25 and 26 has a leading end portion 33, a follower portion 35, and an elbow portion 34 located between the leading end and follower portions 33 and 35. The leading end portion 33 of each guide arm 25 and 26 is sufficiently long so that the follower portion 35 can reach an edge of the workpiece. Each elbow portion 34 has a pair of bends to position the follower portion 35 about ½ inch below and in perpendicular alignment with the leading end portion 33. Thus, when the leading end portion 33 of guide arm 25 is inserted through the apertures of guide ears 27 and 29, it may be lockably positioned to allow the follower portion 35 to be selectively distanced from the saw blade 5 so as to be able to engage and ride along a side of the workpiece, thereby controlling the cutting path of the power saw 1 in a direction parallel to the side of the workpiece that is engaged by the follower portion 35 of guide arm 25.

More particularly, and depending upon the width of the piece to be cut off the workpiece, the follower portion 35 of guide arm 25 may be moved closer to or further from saw blade 5 by loosening locking screw 24 through lug 28 and sliding guide arm 25 through the guide ears 27 and 29. Once the desired distance from blade 5 is achieved, locking screw 24 is tightened against guide arm 25 to prevent the further displacement thereof. As the saw 1 is moved to cut the workpiece, the follower portion 35 of guide arm 25 is correspondingly moved along a side of the workpiece to enhance the accuracy of the cut by causing the blade to move in a line that runs parallel to the side of the workpiece so that the width of the cut off piece will be uniform.

In this same regard, when the leading end portion 33 of guide arm 26 is inserted and selectively positioned in its respective channel guide 30 and guide ears 31 and 32, the follower portion 35 of guide arm 26 can be initially spaced from and adapted to move towards and engage the rear end of the workpiece whereby to impede further movement of power saw 1 in a longitudinal direction along the workpiece. Guide arm 26 may be moved closer to or further from saw blade 5 by loosening locking screw 24 through lug 28 and sliding guide arm 26 through the guide channel 30 and the channel ears 31 and 32. In the assembled relationship of FIG. 1, the leading end portion 33 of guide arm 26 overlays the leading end portion 33 of the guide arm 25 at a point below the lug 28 of guide ear 27. Once the desired distance from saw blade 5 is achieved (depending upon the length of the cut to be made), locking screw 24 is tightened against the overlaying guide arm 25, thereby retaining both guide arms 25 and 26 against further displacement. It is contemplated that either one or both of guide arms 25 and 26 may be calibrated to enable a more precise movement of the saw 1 relative to the workpiece. As the power saw 1 is moved along a longitudinal path to cut the workpiece, the follower portion 35 of guide arm 26 which is initially spaced from the workpiece will move a corresponding distance towards and eventually strike the rear end of the workpiece so as to prevent any further movement of the saw 1 and thereby control the length of the cut to be made by blade 5.

Although the cutting guide 15 has been described above as controlling the cut in a longitudinal direction relative to the workpiece, it is to be understood that a cut in the lateral direction may also be controlled. In this case, the follower portion 35 of guide arm 25 will engage and ride along an end of the workpeice, while the follower portion 35 of guide arm 26 will be spaced from and adapted to move towards a side of the workpiece as the cutting tool moves through a lateral cutting path.

While the cutting guide 15 has been described hereinabove as having both adjustable guide arms 25 and 26 that are releasably affixed at the same time to guide plate 16 so that the cutting tool 1 can be moved a predetermined distance relative to the workpiece along a longitudinal cutting path that runs parallel to a side of the workpiece, it is to be understood that only a single one of the guide arms 25 and 26 need be used at any one time. More particularly, in the case where the length of the cut is not important, such as where the workpiece will be completely severed into two pieces, the guide arm 26 is not required, and only guide arm 25 need be used.

In another case where it is desirable to make a straight cut that runs perpendicular to the bottom of the workpiece, the guide arm 26 may be loosely connected to the guide plate 16. That is, rather than tighten down the locking screw 24 through the lug 28 of guide ear 27 against guide arm 26 to prevent the displacement of guide arm 26 relative to the guide plate 16, the guide arm 26 may be held loosely in place so as to be adapted to slide through channel 30 and guide ears 31 and 32 in response to a pulling force applied thereto. Moreover, rather than initially space the follower portion 35 of guide arm 26 a predetermined distance from the bottom of the workpiece to control the length of the cut, the follower portion 35 can otherwise be positioned so as to lie flush against the bottom of the workpiece.

Hence, as the saw 1 is moved along the workpiece to make a longitudinal cut, the position of the guide arm 26 relative to the workpiece will not change. The position of guide arm 26 is fixed because of the engagement of the follower portion 35 thereof against the bottom of the workpiece. The guide arm 26 is otherwise pulled outwardly and away from the guide plate 16 as the guide plate moves with the saw 1 to cut the workpiece such that the guide arm 26 will not move with saw 1. So long as the follower portion 35 of guide arm 26 remains flush against the bottom of the workpiece, the longitudinal path along which the saw 1 moves to cut the workpiece will at all times be aligned perpendicular to the bottom of the workpiece.

It will be apparent that while a preferred embodiment of the invention has been shown and described, various modifications and changes may be made without departing from the true spirit and scope of the invention. For example, the guide plate 16 of the cutting guide 15 is preferably formed from a single piece of metal. However, it is contemplated that an equivalent apparatus could be assembled from a plurality of component parts. In this same regard, similar apparatus could be injected molded from an appropriate plastic material. Additionally, although in the preferred embodiment rods of circular cross-section are used to form the guide arms, it is also contemplated that other cross-sectional shapes of guide arms may be utilized, including, but not limited to, planar, rectangular, triangular, and square. The invention is not to be regarded as being limited to the type of locking screw which may be employed to apply locking pressure, since any commonly available screw of sufficient length may be used, including thumb screws and hexagon headed screws.

Having thus set forth the preferred embodiment of the invention, what is claimed is:

1. For attachment to a cutting tool for cutting a substantially planar workpiece having at least a side and an end, a cutting guide to control the cut made by the cutting tool, said cutting guide comprising:

a frame;

attachment means to releasably attach said frame to the cutting tool;

first cutting control means extending in a first direction from said frame to engage and move along the side of the workpiece as the cutting tool moves relative to the workpiece for causing the cutting tool to move in a cutting path through the workpiece that is parallel to the side of the workpiece; and second cutting control means extending in a second direction from said frame for initially positioning said second cutting control means to a distance beyond the end of the workpiece, said second cutting control means moving towards and engaging the end of the workpiece as the cutting tool moves in said cutting path parallel to the side of the workpiece for limiting the length of the cutting path through the workpiece to said distance.

2. The cutting guide recited in claim 1, wherein said frame has an L-shape.

3. The cutting guide recited in claim 1, further comprising means by which to releasably secure said first and second cutting control means to said frame so that the positions of said first and second cutting control means can be selectively adjusted relative to the side and end of the workpiece.

4. The cutting guide recited in claim 1, wherein each of said first and second cutting control means includes an elongated bar, said first and second control means bars extending from said frame in said first and second directions and in perpendicular alignment relative to one another.

5. The cutting guide recited in claim 4, further comprising at least first and second channel members affixed to and extending along said frame in perpendicular alignment with one another, said first and second cutting control means bars being slidably received through respective ones of said first and second channel members.

6. The cutting guide recited in claim 5, further comprising fastener means to releasably engage said first and second cutting control means bars and thereby prevent said cutting control means bars from sliding through said respective first and second channel members.

7. The cutting guide recited in claim 6, wherein said fastener means is a locking screw, said perpendicularly aligned first and second cutting control means bars overlapping one another and said locking screw engaging said cutting control means bars at the point at which said bars overlap one another to prevent the displacement of said bars.

8. The cutting guide recited in claim 1, wherein each of said first and second cutting control means has first and opposite ends and an elongated rod portion located at the first end to be coupled to and displaced relative to said frame and a follower portion located at the opposite end to engage one of the side and end of the workpiece, the elongated rod portions of said first and second control means being arranged in perpendicular alignment relative to one another.

9. The cutting guide recited in claim 8, wherein the follower portions of said first and second cutting control means are also arranged in perpendicular alignment relative to one another.

10. The cutting guide recited in claim 9, wherein said follower portions of said first and second cutting control means are separated from and spaced below respective ones of said rod portions of said first and second cutting control means.

11. The cutting guide recited in claim 10, further comprising an elbow portion connected between the rod portion and the follower portion of each of said first and second cutting control means so that said follower portion is separated from and spaced below said rod portion.

12. The cutting guide recited in claim 1, wherein said attachment means to releasably attach said frame to the cutting tool includes at least one locking channel affixed to said frame to receive the tool therewithin and a fastener to be removably received through said locking channel so as to apply a clamping pressure against the tool and thereby prevent the separation of said frame from the tool.

* * * * *